March 17, 1964     G. L. BIRD ETAL     3,125,375
SAFETY SEAT HARNESS FOR VEHICLE Filed May 10, 1962     3 Sheets-Sheet 1

INVENTORS
GEORGE L. BIRD AND
ROBERT A. BROWN
BY
ATTORNEYS

March 17, 1964  G. L. BIRD ETAL  3,125,375
SAFETY SEAT HARNESS FOR VEHICLE
Filed May 10, 1962  3 Sheets-Sheet 2

FIG. 4

*INVENTORS*
GEORGE L. BIRD AND
ROBERT A. BROWN
BY Cumpston & Shaw
ATTORNEYS

March 17, 1964 G. L. BIRD ETAL 3,125,375
SAFETY SEAT HARNESS FOR VEHICLE
Filed May 10, 1962 3 Sheets-Sheet 3
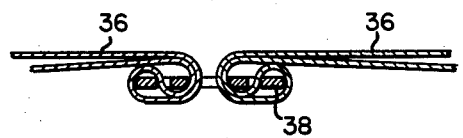
FIG. 5
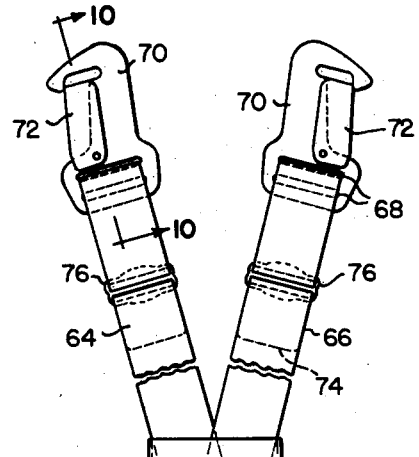
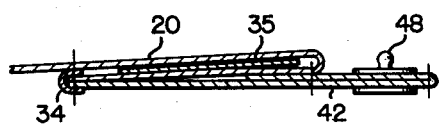
FIG. 7
FIG. 9
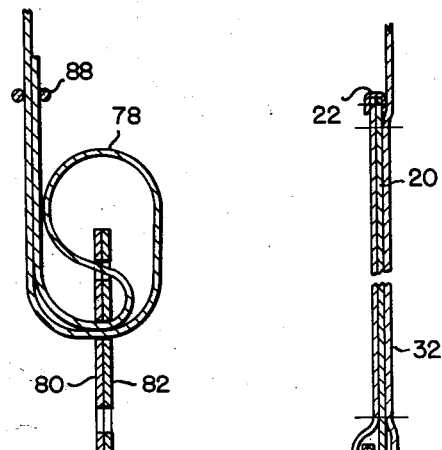
FIG. 11
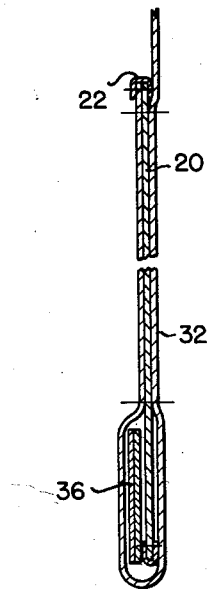
FIG. 6
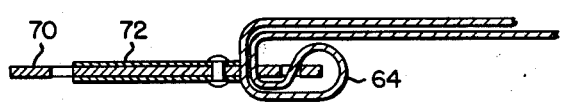
FIG. 10
INVENTORS
GEORGE L. BIRD AND
BY ROBERT A. BROWN
Cumpston & Shaw
ATTORNEYS

United States Patent Office 3,125,375
Patented Mar. 17, 1964

3,125,375
SAFETY SEAT HARNESS FOR VEHICLE
George L. Bird and Robert A. Brown, Rochester, N.Y.,
assignors to Hickok Manufacturing Co., Inc., Rochester, N.Y., a corporation of New York
Filed May 10, 1962, Ser. No. 193,772
7 Claims. (Cl. 297—389)

This invention relates to safety seat harness for vehicles, such as automobiles and airplanes, particularly suitable for use on chldren as occupants of such vehicles.

One object of the invention is to provide an improved harness of the above character having a more reliable, practical and convenient construction and mode of use and operation.

Another object is the provision of a construction for such a harness which facilitates the engagement of the harness with the attaching and anchoring means on the floor or other part of the vehicle.

A further object is to provide a harness construction having convenient and effective means for adjusting the harness to the height and girth of the wearer.

Still a further object is to supply a harness including garment means or vest for the wearer which effectively distribute shock load over a wider area of the body, with increased safety and comfort for the wearer and as particularly desirable for children.

To these and other ends the invention resides in certain improvements and combinations of parts, all as will be hereinafter more fully described, the novel features being pointed out in the claims at the end of the specification.

In the drawings:

FIG. 4 is a still larger elevation of the front side of the harness, laid flat and partly broken away;

FIG. 5 is a sectional view of portions of the waist straps on the line 5—5 in FIG. 4;

FIG. 6 is a section on the line 6—6 in FIG. 4 showing the connection of a shoulder strap with the vest body and waist strap;

FIG. 7 is an enlarged sectional view on the line 7—7 in FIG. 4 showing an end of the vest body and related shoulder strap;

FIG. 9 is an enlarged view of the anchoring or attaching strap means;

FIG. 10 is an enlarged section on the line 10—10 in FIG. 9 showing a portion of the anchoring strap means, and FIG. 11 is an enlarged section on the line 11—11 in FIG. 9 showing another portion of the anchoring strap means.

Figure 1:
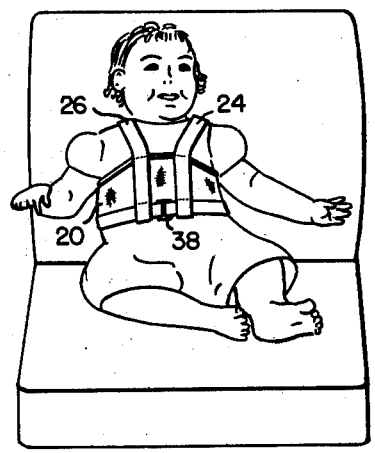
FIG. 1 is a perspective elevation of a harness embodying the present invention as applied to a child on a vehicle seat.

The invention is herein disclosed in an illustrative embodiment comprising a body enclosing harness or vest portion 20, made of a flexible nylon mesh material with its edges finished by suitable bindings 22. A pair of spaced, flexible, supporting shoulder straps 24 and 26 each has one end fixed to the vest at its top. Each of these straps preferably extends down the front side of the vest (FIG. 4) around its bottom edge and back to the top edge, with stitching, as 28 and 30, securely uniting the strap to the vest, except adjacent the bottom of the vest at its front where the strap is left unattached, as at 32, to provide a keeper portion for slidably containing a waist strap hereafter described.

Each lateral edge or end of the vest is folded inwardly upon itself as at 34, FIG. 4, with the edge of the folded portion stitched to the vest so as to provide a pocket in which the other or lower end 35 of the corresponding shoulder strap is slidably contained. At the bottom edge of the vest each shoulder strap is continuously turned inwardly to form a waist strap portion extending downwardly and inwardly along the bottom of the vest. Passing thus around the wearer's side, each waist strap extends across the bottom of the front side of the vest as at 36, through the corresponding keeper portion 32 formed as aforesaid by the shoulder strap. The ends of the waist straps are thus brought together and slidably looped through slots in a plate 38, FIG. 5, by which the ends are adjustably but frictionally and securely bound and fastened together, after adjustment of their length to accommodate the girth and height of the wearer.

Figure 3:
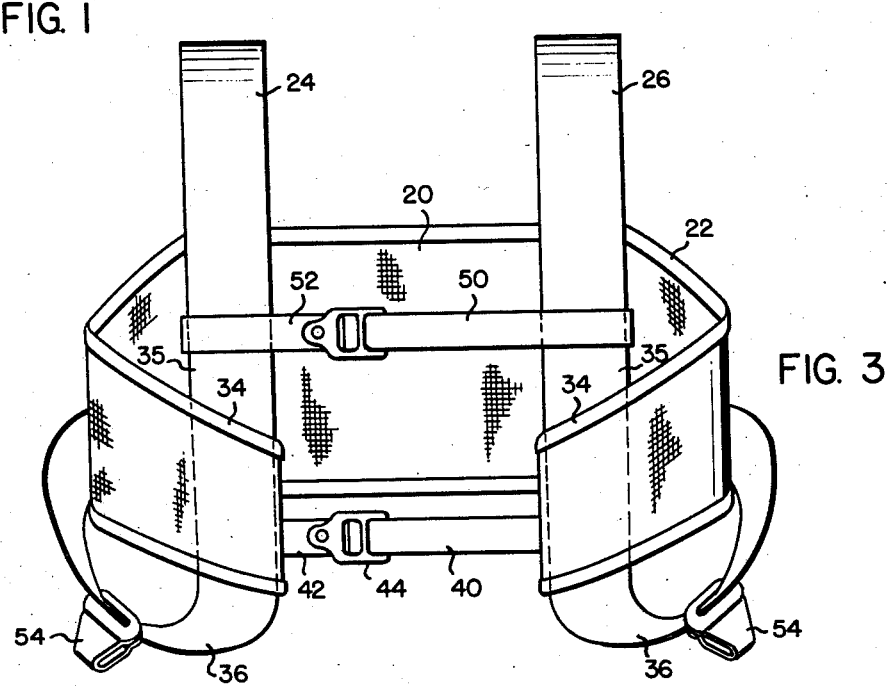
FIG. 3 is an enlarged perspective view of the rear side of the vest or body-enclosing portion of the harness.

The inwardly folded lateral edges of the vest 34 are adjustably connected by a back strap in two parts 40 and 42, FIGS. 3, 4 and 7. One of these parts, as 40, has its end adjustably secured to a doubly slotted plate 44 provided with a stud fastener element 46 of known or suitable construction. The strap is looped through the slots of plate 44 for adjusting the length of the strap part and securing it to the plate. The other strap part 42 has fixed at its end a post element 48 for releasable connection, by snap fastener action, to the stud 46 of the other strap part.

An additional back strap has substantially the same construction as strap 40—42, being formed by two parts 50 and 52, FIGS. 3 and 4, except that each strap part has its outer end folded upon itself and slidably looped about the corresponding shoulder strap, to adjustably connect the shoulder straps above the vest, so that by means of these shoulder straps the vest may be snugly fitted to the body of the wearer.

Figure 8:
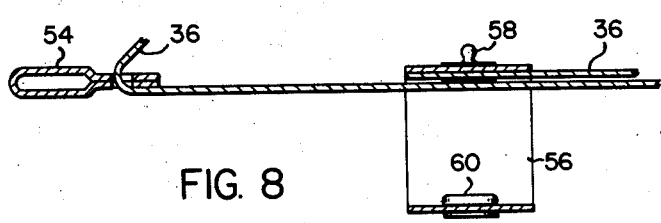
FIG. 8 is a sectional view substantially on the line 8—8 in FIG. 4, but with a keeper strap in opened position.

The waist straps are adjustably attached and anchored to strap means adapted to extend between a seat and seat back of a vehicle, for connecting the waist straps to the floor or other part of the vehicle. For this purpose each waist strap is passed through a slot in one part 54 of a spring actuated connector clip (FIGS. 3 and 4) so that the connector part is slidably adjustable along the waist strap below the vest, for positioning below the center of gravity of the wearer to provide more adequate protection by preventing the sliding downwardly of the wearer under shock loads. Each waist strap preferably has its end extended from the plate 38 along the inside of the waist strap and provided with keeper bands as 56 (FIGS. 4 and 8). One end of each band is fixed to the end of the waist strap by a post element 58 cooperating with a stud 60 fixed on the other end of the band, and these bands adjustably maintain the end of each waist strap slidably associated with its main portion.

The strap means for anchoring the vest to the vehicle preferably comprises a main strap portion 62 (FIG. 9) having a bifurcated upper end providing spaced bifurcations 64 and 66. Each of these bifurcations has its outer end looped through a pair of slots 68 in a hook shaped plate 70 with a pivoted, spring actuated dog 72, for releasably closing the opening of the hook. The hook is thus adapted to be conveniently snapped and securely fastened to the part 54 on the corresponding waist band portion. The outer end 74 of each bifurcation is passed, along with its main portion, through slots in a slider plate 76, for adjusting the length of the bifurcation.

Figure 2:
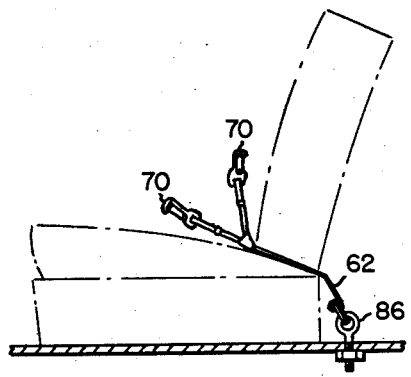
FIG. 2 is a side elevation showing the means for anchoring attachment of the harness to the vehicle floor.

The lower end of strap 62 is folded upon itself as at 78, FIGS. 9 and 11, and threaded through a pair of slots in each of a pair of sister hooks 80 and 82. Each of the plates 80 and 82 is formed with a hook portion, as 84, adapted to overlie, in opposite direction, the hook of the other plate for securely engaging a fitting such as an eyebolt 86, FIG. 2, fixed in the floor of the vehicle back of the seat. A keeper formed by a length of wire 88, FIGS. 9 and 11, adjustably holds the outer end of the strap to its main portion. The main portion 62 of the strap, as well as its bifurcations 64 and 66, are thus conveniently adjustable in length to suit varying installations, while holding the wearer in proper position in relation to the car seat.

The several strap means referred to above are preferably made of strong but pliable webbing of known woven construction.

It is apparent from the above description that the invention provides a safety harness for vehicle seats having a reliable, practical and convenient construction and mode of operation. The provision of a vest type harness for the wearer serves to distribute any shock load over a maximum area of the body, for greater safety and comfort. The several parts are quickly and conveniently adjustable in their dimensions and relation to one another to facilitate the convenient adaptation of the harness to the wearer and the dimensions of the vehicle.

It will thus be seen that the invention accomplishes its objects and while it has been herein disclosed by reference to the details of a preferred embodiment, it is to be understood that such disclosure is intended in an illustrative, rather than a limiting sense, as it is contemplated that various modifications in the construction and arrangement of the parts will readily occur to those skilled in the art, within the spirit of the invention and scope of the appended claims.

We claim:

1. A safety seat harness for vehicles comprising a flexible fabric vest adapted to encircle and support the central portion of a wearer's body, means for adjusting the size of said vest to fit the wearer's body, a pair of shoulder straps each adapted to pass, separately of the other, over one shoulder of the wearer with one of its ends fixed to said vest and its other end slidably connected with said vest and extended to form a waist strap portion, means for adjustably connecting said waist strap portions to adjust the lengths of said shoulder straps and of said connected waist strap portions, and means for connecting said waist strap portions to said vehicle.

2. A safety seat harness for vehicles comprising a flexible fabric vest adapted to encircle and support the central portion of a wearer's body, means for adjusting the size of said vest to fit the wearer's body, a pair of shoulder straps each adapted to pass over one shoulder of the wearer with one of its ends fixed to an upper portion of said vest and its other end slidably connected with a lower portion of said vest and extended to form a waist strap portion, means for adjustably connecting said waist strap portions to simultaneously adjust the lengths of said shoulder straps and of said connected waist strap portions, and means for connecting said waist strap portions to said vehicle.

3. A safety seat harness for vehicles comprising a flexible fabric vest adapted to encircle and support the central portion of a wearer's body below the arms, means for adjusting the size of said vest to fit the wearer's body, a pair of shoulder straps each adapted to pass, separately of the other, over one shoulder of the wearer with one of its ends fixed to an upper portion of said vest and its other end slidably connected with a lower portion of said vest and extended to form a waist strap portion, means for adjustably connecting said waist strap portions to simultaneously adjust the lengths of said shoulder straps and of said connected waist strap portions, and means for connecting said waist strap portions to said vehicle.

4. A safety seat harness for vehicles comprising a flexible fabric vest adapted to encircle and support the central portion of a wearer's body, means for adjusting the size of said vest to fit the wearer's body, a pair of shoulder straps each adapted to pass over one shoulder of the wearer with one of its ends fixed to said vest and its other end slidably connected to said vest and extended to form a waist strap portion, means for adjustably connecting said waist strap portions to adjust the lengths of said shoulder straps and of said connected waist strap portions, and means adapted to extend between a seat and seat back and to connect spaced parts of said waist strap portions to said vehicle.

5. A safety seat harness for vehicles comprising a flexible fabric vest adapted to encircle and support the central portion of a wearer's body, below the arms, means for adjusting the size of said vest to fit the wearer's body, a pair of shoulder straps each adapted to pass, separately of the other, over one shoulder of the wearer with one of its ends fixed to an upper portion of said vest and its other end slidably connected with a lower portion of said vest and extended to form a waist strap portion, means for adjustably connecting said waist strap portions to simultaneously adjust the lengths of said shoulder straps and of said connected waist strap portions, and strap means adapted to extend between a seat and seat back and provided with means for connection with said vehicle, said strap means having a bifurcated upper end, means for adjusting the length thereof and means for releasably connecting said bifurcated ends to said waist straps, respectively.

6. A safety seat harness for vehicles comprising a flexible fabric vest adapted to encircle and support the central portion of a wearer's body, means for adjusting the size of said vest to fit the wearer's body, a continuously connected strap having spaced portions fixed to said vest and each adapted to extend over a wearer's shoulder, said strap having other spaced portions slidably connected to said vest and extended to form waist strap portions, means for adjustably connecting said waist strap portions to simultaneously adjust the lengths of said shoulder straps and waist portions to fit the wearer's body and means for connecting said waist strap portions to said vehicle.

7. A safety seat harness for vehicles comprising a flexible fabric vest adapted to encircle and support the central portion of a wearer's body, below the arms, means for adjusting the size of said vest to fit the wearer's body, a continuously connected strap having spaced portions fixed to the upper part of said vest and adapted to extend over the wearer's shoulders, said strap having other spaced portions slidably connected to the lower portion of said vest and extended to form connected waist strap portions, means for adjusting the lengths of said shoulder portions of said strap and said waist strap portions to simultaneously adjust the same to fit the wearer's body, strap means adapted to extend between a seat and seat back with bifurcated means for connection with said vehicle, and means for adjusting the length of said bifurcated means and for releasably connecting the same to said waist straps.

References Cited in the file of this patent

UNITED STATES PATENTS

| | | |
|---|---|---|
| 2,653,368 | Elsner | Sept. 29, 1953 |
| 2,908,324 | Muller | Oct. 13, 1959 |
| 2,960,180 | Wachtel | Nov. 15, 1960 |
| 3,028,200 | Dye | Apr. 3, 1962 |